March 13, 1951 G. T. DRAKELEY ET AL 2,544,985
TRACK-TYPE LANDING GEAR
Filed July 11, 1949 3 Sheets-Sheet 1
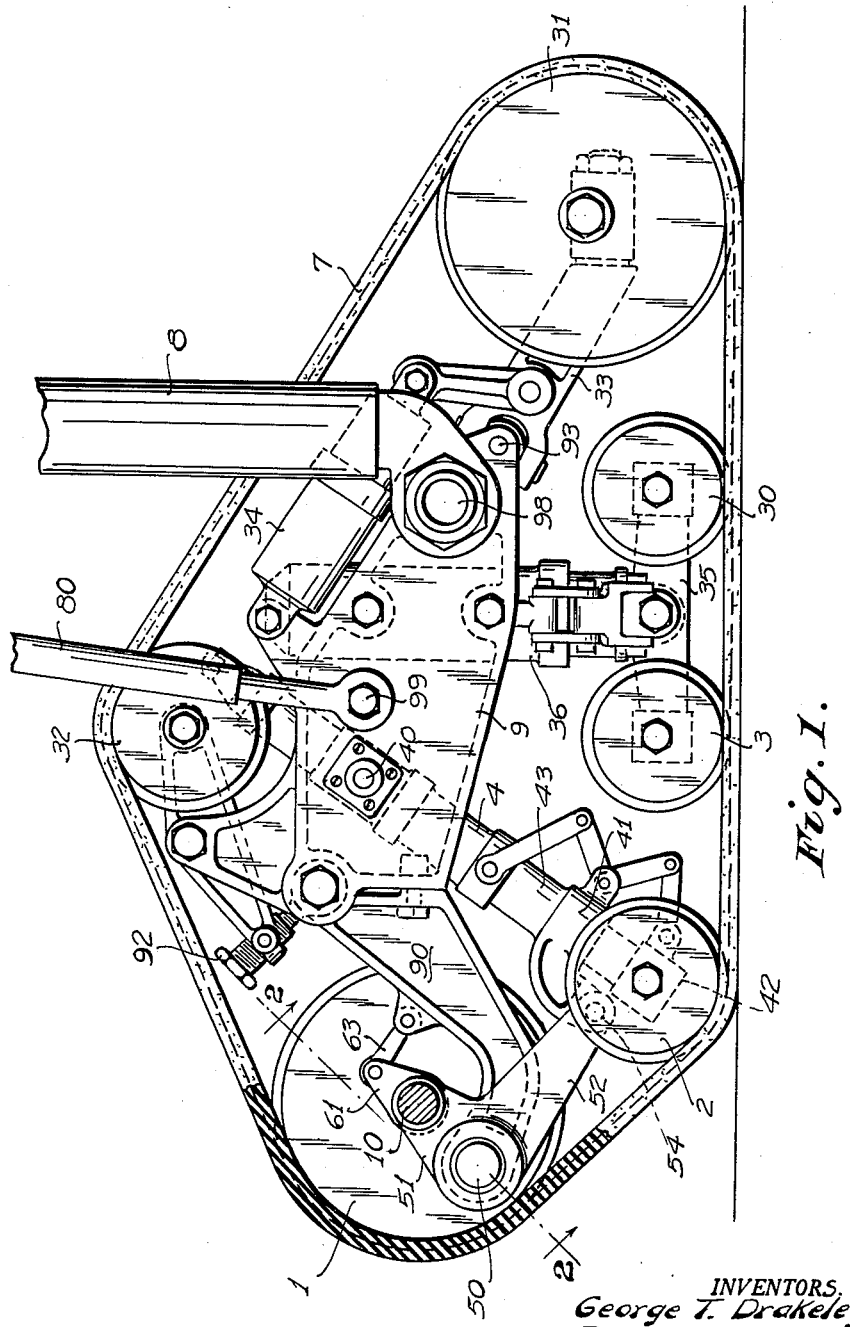
INVENTORS,
George T. Drakeley
Donald W. Finlay
REYNOLDS & BEACH
ATTORNEYS
BY Charles L. Reynolds INVENTORS.
George T. Drakeley
Donald W. Finlay
REYNOLDS & BEACH
ATTORNEYS
BY Charles L. Reynolds March 13, 1951 G. T. DRAKELEY ET AL 2,544,985
TRACK-TYPE LANDING GEAR
Filed July 11, 1949 3 Sheets-Sheet 3
Fig. 4.
Fig. 5.
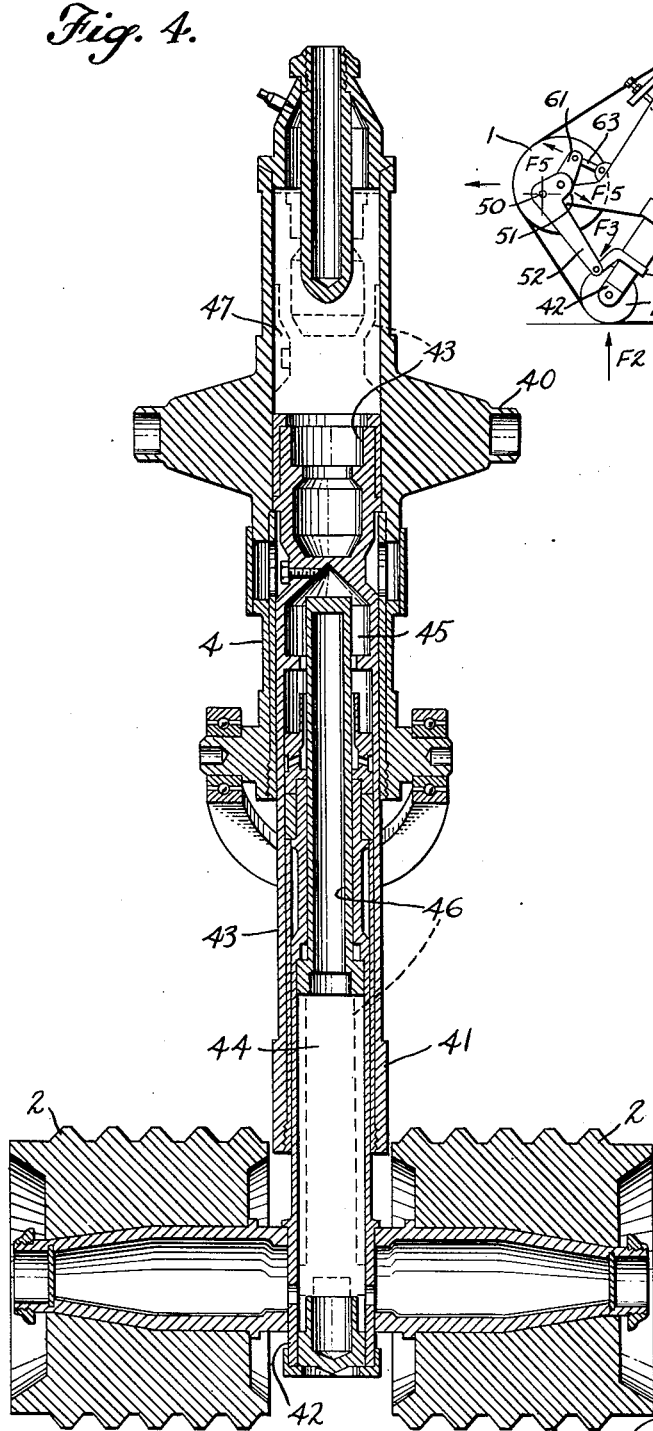
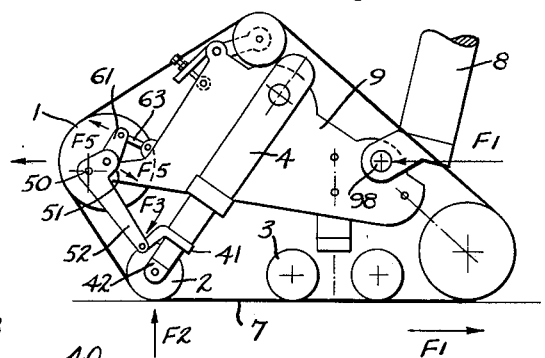
INVENTOR.
GEORGE T. DRAKLEY
DONALD W. FINLAY
BY
Reynolds & Beach
ATTORNEYS Patented Mar. 13, 1951

2,544,985

UNITED STATES PATENT OFFICE 2,544,985

TRACK-TYPE LANDING GEAR

George T. Drakeley and Donald W. Finlay, Seattle, Wash., assignors to Boeing Airplane Company, Seattle, Wash., a corporation of Delaware Application July 11, 1949, Serial No. 104,051

10 Claims. (Cl. 244—100)

Track-type landing gear, such as this invention concerns, is in general of known type. An endless track band runs about wheels which define an irregularly quadrangular pattern, and usually most of the wheels are resiliently supported with relation to a landing gear frame in such manner that the pattern is somewhat deformable resiliently with respect to that frame in accordance with the static load and in response to transient shocks or other forces such as arise, ordinarily, while proceeding over rough or uneven ground. Indeed, one of the primary reasons for employing such track-type landing gear is the expectation that landings will be required on such rough or uneven ground, characteristic of unprepared or partially prepared landing fields, for they have the advantage of ready adaptability to such surfaces, while affording a large, rather constant area of ground contact and consequent distribution of the load over soft ground.

Like any ground-engaging element of a landing gear, track bands must be braked, and often the braking forces are large; for fields of this type may be short. Such braking forces as applied to a wheel and thence to the track band running thereabout tend to set up pitching moments about the axis where the landing gear frame is mounted upon the main strut, and in this manner and otherwise tend to load the shock absorber or shock absorbers which resist deformation of the pattern of the track band to a degree which may leave but little residual resilience to counter the forces generated by ground irregularities. These ground irregularities, particularly prevalent in landing fields of the type that call for track-type landing gear, are generally of two types, being either long swells, hummocks, or dips, or else boulders and like abrupt obstacles. The absorption of loads arising from such sources, at all times, is of great importance to the integrity and to the safety of the aircraft.

Instead of attempting to design a shock absorber for use in such landing gear which affords a compromise between the ability to absorb the more gently applied but often large and long-continued forces arising from swells, and to absorb the abruptly and briefly applied heavy shocks of boulders, there has been devised a shock absorber which is in effect a pair of units in tandem, one whereof, identified as the soft unit, receives and absorbs the gently applied forces but is relatively insensitive to brief, abrupt forces or shocks, and the other of which, identified as the hard unit, absorbs the more abrupt and briefer shocks but is relatively insensitive to the gentler forces. This shock absorber, per se, constitutes the subject-matter of a copending application, Serial No. 104,052, filed July 11, 1949, coincidentally herewith. Its structure will be described hereinafter to the extent necessary to understand its effect upon the present combination, of which it is a part.

The use of such a shock absorber introduces more than the usual complications during braking of a track-type landing gear wherein it is incorporated. Since the braking forces are large in value, and long-continued, and are so applied through the track band that they tend to compress the shock absorber, they tend to use up the entire resistive effect of the soft unit of the shock absorber. There would remain available for absorbing loads arising while traversing irregular ground only such part of the hard unit as might not be employed in resisting the braking forces. This would probably be adequate to absorb shocks from boulders, but there would remain no usable residue of the ability to yield to and absorb longer-continued forces arising from swells, such as was intended by the original design. The result would be the transmission to the airframe of quite appreciable forces, with undesirable results, during braking.

This invention concerns the arrangement of the shock absorber and of the wheels, frame, immediate wheel supports, and brake elements, in such relationship that the application of the brakes automatically produces a force opposing and generally equaling the brake-induced force which tends to deflect the soft unit, whereby the net result is that the soft unit as well as the hard unit are equally available during brake application no less than during taxying to resist and absorb all ground loads, to substantially the full extent intended by the design.

More specifically, according to this invention use is made of the brake reaction torque to transmit, with suitable mechanical advantage, a force which neutralizes that component of the braking force which tends to compress the shock absorber; since the compressive force acts primarily upon the soft unit, the neutralizing force is applied primarily to the soft unit, and resists its compression at all stages of the braking substantially in the same degree that the braking forces tend to compress it. Nevertheless, if the compressive force thereon, during braking, is augmented by a ground load the soft unit is as free to yield as it was in the absence of braking. The braking forces also tend to affect the hard unit, but since by design the soft unit is so much more sensitive than the hard unit to forces of this nature, the net effect on the hard unit is negligible, and this can be considered to be substantially as sensitive to abrupt shocks during braking as it is in the absence thereof. In the ultimate result the shock absorber is left free at all times to absorb such ground loads as it was designed to absorb, the transmission of forces to the airframe is minimized at all times, the tendency to pitching is largely eliminated, and the area of ground contact of the track band, and the effective tractive or braking area, remains generally constant.

The provision of a combination and arrangement of the parts of a track-type landing gear to these ends is the primary object of this invention.

More specifically, it is an object to devise a track-landing gear wherein it is feasible to employ and obtain the benefit of such a tandem, hard-soft unit shock absorber, so that the same is substantially fully operable at all times and under all conditions of use, and in which such shock absorber neither interferes with braking nor is itself adversely affected by braking.

The present invention, then, comprises the novel track-type landing gear, which includes in particular the relative arrangement and coordination of a front braking wheel, a bogie wheel intermediate the braking wheel and another bogie wheel rearwardly of both, and a shock absorber—and in a special form, a shock absorber having the general characteristics indicated—operatively connected to the intermediate wheel, all as shown in the accompanying drawings in a typical form, and the principles whereof will be hereinafter more fully disclosed and claimed.

The accompanying drawings illustrate a practicable embodiment of the present invention in a track-type landing gear for aircraft.

Figure 1 is in general a side elevation, with parts broken away and shown in section, illustrating the landing gear with parts shown in the static ground-borne attitude, such as it is desirable to maintain or at least approximate under all ground-borne conditions.

Figure 3:
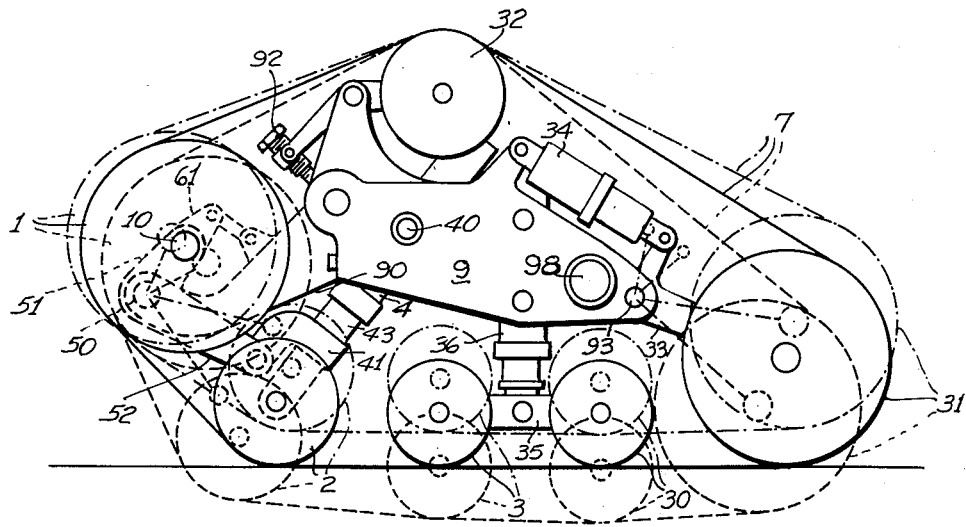

Figure 3 is a simplified and somewhat diagrammatic side elevation view of the landing gear, showing whence various parts have been removed, omitted, or simplified in form, in solid lines the taxying position of the parts (which also is the braking position, and corresponds to the position of parts in Figure 1), in dash lines the relaxed or airborne position of the parts, and in dot-dash lines a shock-loaded position of the parts.

Figure 4 is an axial sectional view of a typical tandem shock absorbing element, such as is used in the present landing gear. Figure 5 is a diagram of the forces acting at the time of brake application.

The frame which is the backbone of the landing gear consists in general of a central structure 9 which in part may be bifurcated, but which includes a forwardly projecting horn 90, which in effect is integral with the main frame. This frame is supported from the aircraft structure in any suitable way, as, for instance, through the shock strut 8 pivoted to the frame at 98, and by an extensible jack or compression strut 80 connected to the frame at 99. The shock strut 8 would usually be formed as a resilient shock absorber. By manipulation of the jack 80 and by proper mounting and control of the upper ends of the struts 8 and 80, it is possible for the landing gear as a whole to be retracted and extended, or to be oriented tail down or in any other desired attitude with relation to the aircraft structure. Such details are no part of the present invention, save that, while ground-borne, the landing gear should be maintained in a constant attitude relative to the ground and to the aircraft, by these or other suitable means.

An endless track band 7, preferably grooved at its inner surface to interfit with and to grip frictionally its supporting wheels, passes about various wheels 1, 2, 3, 30, 31 and 32, disposed in an irregularly quadrangular pattern about the frame 9, 90, and supported therefrom either directly or through means which permit them to move, relatively to the frame and complementally to one another, resiliently in accordance with shock or other loads imposed upon them. Thus, for instance, the rear wheel 31 is supported upon an L-shaped lever arm 33 (which may be in one piece as diagrammatically shown in Figure 3), pivotally mounted at 93 to the frame 9 to rock about a horizontal transverse axis, and it may, if desired, be articulated as shown in Figure 1 to rock also about a somewhat upright axis. Its position is determined by the loading of the resilient shock absorber 34 reacting from the frame 9. The bogie wheels 3, 30, mounted in the bogie frame 35, are somewhat similarly mounted and resiliently supported from the frame 9 by means of the shock absorber 36, and the wheel 32 serves, by reason of the adjustment at 92, as the tightener for the track band 7, and is the only one of the wheels which is normally fixedly positioned with relation to the frame 9.

The particular form and arrangement of these wheels and their relationship in detail to the frame 9 and to each other are not in themselves highly important to the present invention. They, or any equivalent means, serve principally to support and guide the track band 7 and to maintain it taut under all conditions of load by their relative and complemental yielding in conjunction with similar yielding of the braking wheel 1 and the front bogie wheel 2, and it is the relationship of the two latter wheels to each other, to the frame, and to the braking arrangement, which constitutes the primary part of this invention.

The front bogie wheel 2 is journaled upon a resiliently reciprocable, downwardly directed plunger element of a shock absorber, and in the special and preferred form illustrated, upon the foremost and lowermost element 42 of a tandem shock absorbing element, the outermost cylinder whereof is indicated by the numeral 4, and which is pivoted at 40 to the frame 9.

The element 42 is slidable as a plunger through a head 41 which is the foremost and lowermost end of a cylinder-like intermediate element 43, which in turn, is slidable as a plunger within the outermost and uppermost cylinder 4. The head 42, bearing the wheel or wheels 2, constitutes a shock absorber element of relatively small mass, having small inertia, which, however, is so heavily preloaded, as by air pressure within the space 44, against which fluid in the space 45 acts by way of the interposed free-floating plunger 46, that the whole will yield only under high pressure or loading, not necessarily of large value, if abruptly applied, such as will be produced in taxying over large stones, corduroy surface, or similar ground irregularities. The intermediate element 43, acting as a plunger within the space 47 of the casing or cylinder 4, however, in itself and through its connections has large mass and inertia, but operates against much lower air pressure in the upper part of space 47, hence is much less highly preloaded, and will operate under lesser loads, provided they are applied sufficiently gradually to overcome the higher inertia of the assembly, as, for instance, over ground swells, dips, or long undulations. It is the fact that this head 41 and its plunger 43 with associated parts is of relatively large mass and consequently higher inertia, which causes it to resist deflection under abruptly applied forces (which latter may cause deflection of the head 42), but which at the same time permits it to yield to lesser shocks than those which will cause movement of the more highly loaded head 42, provided they are more gradually applied. The construction and arrangement of a shock absorber to these ends is shown in Figure 4 of this application, and in greater detail in the companion application Serial No. 104,052, referred to hereinabove. However, since any suitable arrangement of shock absorbing means to the same end, and having similar characteristics, or even a single-acting shock absorbing means, may be substituted therefor, it is not considered that any particular construction in detail of the shock absorber is a part of this invention, and hence the showing herein is considered as illustrative rather than restrictive.

The application of a braking force to the braking wheel 1 produces a drag on the track band 7, and in turn upon the ground with which the lower horizontal portion of the track band, between wheels 2 and 31, is engaged. Such drag tensions the track band between the braking wheel 1 and the bogie wheel 3, and tends to straighten the band between these two wheels. This produces a force of material amount and duration, acting upwardly upon the front bogie wheel 2, which if not otherwise resisted would push the wheel 2 upwardly, and would use up most or all its resistance to compression, leaving no cushioning for ground loads, particularly in the soft, less preloaded unit. The drag of the track band upon the ground also produces a moment about the main pivot support 98, and the resultant of such forces would cause the frame 9 to pitch about the pivot at 98 or to tend so to do, particularly if the front bogie wheel 2 is forced upwardly. It follows that it is highly desirable to prevent the soft unit of the shock absorber from compressing under such forces, yet by design it is inherently yieldable to just such forces if they are applied sufficiently gradually or throughout a sufficient period of time to overcome the inertia of the head 41 and plunger 43 and associated parts. The solution adopted is to cause brake application to react automatically, and, in this particular form, through mechanical linkage and at correctly calculated mechanical advantage, to resist compressive movement of the soft resilient unit 43, 4 to such degree as is necessary to resist the compressive effect of braking, leaving it free to compress, as before, under loads otherwise derived. The action has been described as "locking out" the soft unit, which is descriptive except as it implies complete inability of the soft unit to compress; it does retain that ability, without substantial diminution, and the "locking out" is only the automatic neutralization of its compression by and during braking, as a result of forces thereby engendered.

The braking wheel 1 is journaled about an axis defined by the spindle 10, which spindle is journaled upon an upwardly and somewhat rearwardly directed arm 51 of a lever which is pivoted at 50 between its ends to the forward end of the frame horn 90, and the longer, rearwardly and somewhat downwardly directed arm 52 of the same lever is pivotally connected at 54 to the head 41. The mass of the lever 51, 52 and of the wheel 1 supplements the mass of the head 41 and plunger 43, to produce the large inertia resisting abrupt movement of the plunger 43. Under normal conditions, that is to say, while there is no braking effect, as when taxying for a take-off, there is little movement of head 42 and wheel 2 relative to the element 43, the stiffness of the lower resilient element preventing, but movement of the head 41 which accompanies the movement of the soft plunger 43 within its cylinder 4 will effect movement of the braking wheel 1 somewhat oppositely to and compensatingly with relation to the entrained movement of the front bogie wheel 2, by reason of the geometrical arrangement and connection of the bell crank lever 51, 52. At the same time, sharp, heavy shocks, as when encountering a boulder, will be accommodated by yielding of the head and plunger 42 within its cylinder 43, but without material yielding of the soft unit because of its higher inertia, and this result will take place without disturbance of the braking wheel 1 to any material degree.

Figure 2:
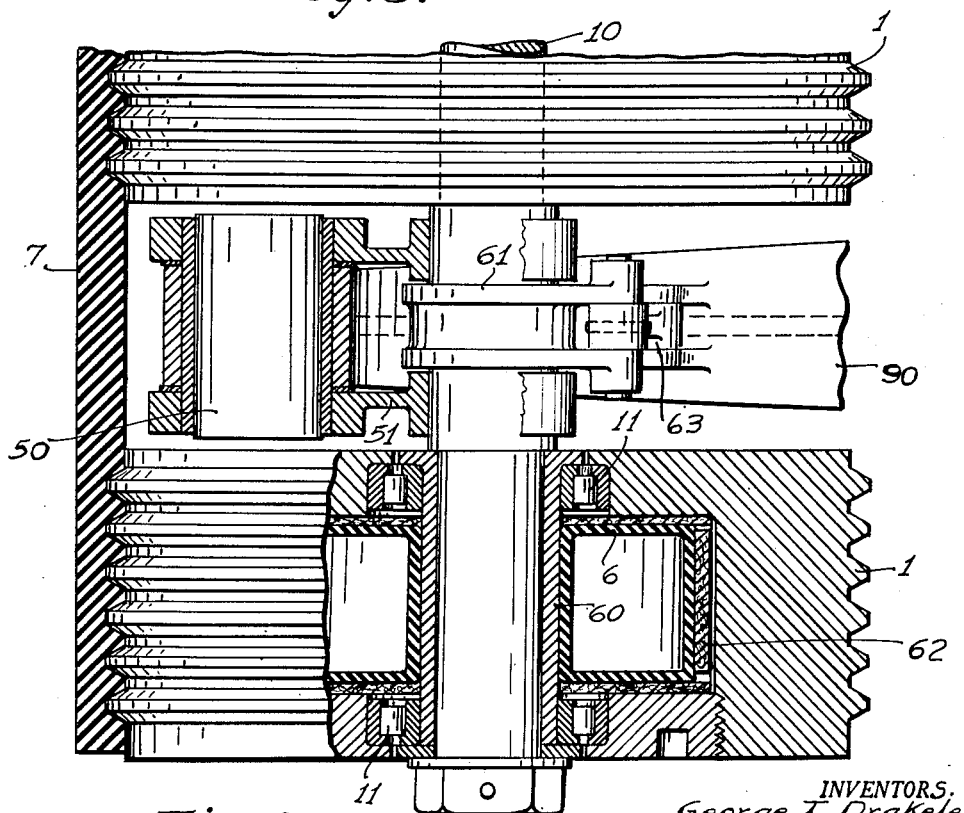
Figure 2 is in general an axial section along the axis of the braking wheel, the line of section being generally indicated at 2—2 in Figure 1.

Braking of the wheel 1 and, in consequence, of the track 7, occurs about the axis 10 of the wheel 1. Any suitable form of brake may be employed, and that illustrated is intended as typical only. For example, and as shown in Figure 2, the spindle 10 carries sleeves 60, which may be pressed on or otherwise held nonrotatively to the spindle, and in similar fashion a short brake reaction arm 61 is secured to or integral with the spindle. These elements 60 and 61 with the spindle 10 constitute in effect a unitary brake torque reaction element, which is oscillatably supported by the short arm 51. The wheel 1, or paired wheels if two are employed as shown in Figure 2, are journaled by antifriction bearings 11 upon the sleeves 60 and may be internally recessed each to receive an expansive braking element 6 bearing a braking shoe 62, which bears within the periphery of the cavity within the wheel 1. Since the expansion of the braking element 6, tending to stop counterclockwise rotation of the wheel 1, would by reaction tend to effect rotation of the brake reaction arm 61 in the same counterclockwise sense, as viewed in Figure 1, such rotation is resisted by anchoring the brake reaction member 61 to the frame. Since movement of the lever 51, 52, under non-braking conditions must not be restrained, the anchoring means takes the form of the torque link 63.

To understand the effect when braking occurs, consider the extreme case if the brake were applied so strongly as to lock the wheel 1 to the brake reaction element which includes the arm 61.

The continued counterclockwise torque acting on the wheel 1 can not now rotate the wheel about the spindle 10, but the wheel is still free to rotate bodily counterclockwise about the outer end of the arm 61, where the latter is pivotally secured to the torque link 63. By reaction through the oscillatable connection between the arm 61 and the short lever arm 51, this produces a clockwise torque on the lever 51, 52 about its pivot axis at 50, urging generally downwardly the longer lever arm 52 and the front bogie wheel 2. Any such locking of the wheel 1 while the track band is rolling about the wheels would also tend to stop the track band, and this would cause a very large drag at the ground-engaging portion of the track band. The forward momentum of the aircraft would create a forward pitching moment about the main pivot support 98, and a resultant reaction at the front bogie wheel 2 urging the latter upwardly, and tending to straighten out the track band between wheels 1 and 3.

Thus there are at least two forces acting on the front bogie wheel 2, the one urging it downwardly, the other urging it upwardly. If by design these opposed forces are made generally equal in value as well as opposite in sense, it follows that the soft shock unit is not compressed even by the locking of the braking wheel 1, and the forces thereby engendered. Briefly, the brake torque reaction may be considered as applied to the soft unit to counteract the force acting thereon as a result of brake torque; this condition prevails throughout braking, and generally speaking the counteracting force automatically equals the distorting force at all stages and values. The braking which caused the tendency to push upwardly the head 41, automatically has produced an equivalent resisting force, holding it against upward movement.

Braking will not ordinarily lock the wheel 1, but in all cases, and to whatever extent the brake is applied, the resultant reaction between the link-held brake reaction arm 61 and the lever arm 51 tends to resist forward movement of lever arm 51 and upward movement of arm 52, to that extent—that is, in consonance with the applied braking force—resisting compression of the soft resilient element 43, 4.

The result of brake application may be understood in detail by reference to Figure 5. The application of braking force at 62 between the rotating wheel 1 and the non-rotative spindle 60 transmits a couple F5 through brake reaction arm 61 to torque link 63 and the short upper arm 51 of the crank lever 51, 52. This tends to rotate that crank lever in a clockwise sense about its fixed fulcrum at 50, so that it places a downward load F3 on the head 41 of the tandem shock absorber. This downward force F3 is used to neutralize an increased upward force F2 made up primarily by the forward shifting of the center of contact pressure of the track band 7 under the influence of the couple F1, and to a lesser degree by the increase in upward load on the bottom of the tandem shock absorber as a result of increased belt tension caused by braking action of wheel 1 on the track band 7. Thus it is seen that brake application immediately and automatically effects a downward load on the head 41 and an upward load at the lower head 42, thus further compressing the lower hard shock absorber unit but does not materially affect the upper soft shock absorber unit. Proportions of crank arms of linkages, of the brake forces, and of the shock absorber resistances, can be so chosen as to obtain a downward load on the head 41 which is sufficient to neutralize the added upward load on the lower end 42 of the shock absorber caused by braking, but not materially in excess of a neutralizing force. Since braking loads on the shock absorber 4, 41, are thus self-neutralizing, but no more, the soft shock absorber can continue to operate during braking in substantially the same manner as in the absence of braking. The hard shock absorber 42, 41 is affected more or less by braking loads, the degree thereof depending on the abruptness of application of such loads, and the design of the particular unit employed. Being designed, as already explained, in such manner that it responds primarily to abruptly applied loads, but not so readily to more gently applied loads, even of large value (since any such gently applied load is at any given instant small in comparison to its own high preloading), this hard shock absorber is not ordinarily greatly affected by the relatively gradual forces set up during braking, hence it too retains to a material degree its ability to yield to abrupt shocks which may arise during braking.

Notwithstanding the "locking out" of the soft unit, 43 within 4, during braking, the ability of that unit to respond to and absorb ground-induced loads is substantially as great as it possesses in the absence of braking. If a ground load is imposed on it during braking, such load is superimposed on the load arising from braking; since only the brake-induced load is neutralized, the excess or superimposed ground load produces normal deflection, just as it would in the absence of braking. Nor does such "locking out" affect the ability of the hard unit, 42 within 43, to deflect under abrupt loads. The resistive force is applied to the head 41, hence does not in any wise apply to nor affect the movable element 42 of the hard unit. This remains free at all times to yield to abrupt loads.

We claim as our invention:

1. In a track type landing gear, an endless track band, a frame; a front bogie wheel, a braking wheel ahead thereof and upraised thereabove, and additional wheels, all wheels being supported from said frame and arranged in a pattern to receive and guide said track band and to maintain a material length of the same, from the front bogie wheel rearwardly, in ground contact while the landing gear is ground-borne; a main pivot support for the frame, located above ground level and behind the braking wheel and the front bogie wheel, about which the landing gear tends to pitch upon brake application; resiliently yieldable means mounted on said frame, forwardly of said main pivot support, and operatively connected to said front bogie wheel to resist its upward movement towards the frame under the influence of surface irregularities and of braking-induced pitching; means separate from but mounted on and for movement relative to the frame, operatively connecting said front bogie wheel and said braking wheel, through said yieldable means, to journal the braking wheel and to displace the same bodily and generally oppositely to movement of the front bogie wheel, to maintain the track band taut; brake means reacting, upon brake application, from said frame upon the braking wheel to resist its rotation, and by reaction upon and through said separate means connecting the front bogie wheel and the braking wheel tending to displace the braking wheel and the front bogie wheel in the sense to neutralize braking-induced upward movement of the front bogie wheel, and consequent upward deflection of the yieldable means under the influence of braking forces alone.

2. A track-type landing gear as in claim 1, including additionally a second resiliently yieldable means of yieldability characteristically differing from that of the first resiliently yieldable means, interposed between the latter and the separate means connecting the front bogie wheel and the braking wheel, on the one hand, and the front bogie wheel, on the other hand, to afford yieldability of the front bogie wheel and of the track band independently of the yieldability characteristic of the first such means.

3. A track-type landing gear as in claim 1, wherein the resiliently yieldable means includes a shock absorber unit mounted upon the frame and including a plunger element mounting the front bogie wheel to urge the latter downwardly, and wherein the separate connecting means comprises a lever pivotally mounted between its ends upon the frame, its one end being operatively connected to said plunger element to rise and fall therewith, and its other end mounting the braking wheel and the brake means.

4. A track-type landing gear as in claim 3, wherein the braking means includes a brake reaction arm, brake resistance means reacting between the braking wheel and said brake reaction arm, and a torque link pivotally connecting the outer end of said brake reaction arm to the frame, and constituting a fulcrum for pivotal movement of said braking wheel and the lever arm whereon the same is mounted, upon brake application tending to lock the brake reaction arm to the braking wheel.

5. In a track-type landing gear, an endless track band, a frame, a front bogie wheel, a braking wheel ahead thereof and upraised thereabove, and additional wheels, all wheels being supported from said frame and arranged in a pattern to receive and guide said track band and to maintain a material length thereof, from the front bogie wheel rearwardly, in ground contact while the landing gear is ground-borne; a shock absorber unit including a cylinder mounted upon the frame and a downwardly-directed plunger reciprocable therein; the front bogie wheel being mounted upon said plunger, a lever pivotally mounted between its ends upon said frame, having a rearwardly directed arm connected to said plunger and an upwardly directed arm whereon said braking wheel is journaled, brake reaction means, including a brake reaction arm, also mounted upon said upwardly directed lever arm, brake torque resisting means interconnecting said brake reaction arm and the frame, and brake means reacting between the brake reaction means and the braking wheel.

6. In a track-type landing gear, an endless track band, a frame, a front bogie wheel, a braking wheel ahead thereof and upraised thereabove, and additional wheels, all wheels being supported from said frame and arranged in a pattern to receive and guide said track band and to maintain a material length thereof, from the front bogie wheel rearwardly, in ground contact while the landing gear is ground-borne; a tandem shock absorber unit including a cylinder mounted upon the frame and a first downwardly-directed plunger reciprocable therein under the influence of relatively soft forces, and a downwardly-directed second plunger reciprocable in the first plunger as its cylinder under the influence of relatively stiff forces; the front bogie wheel being mounted upon said second plunger, a lever pivotally mounted between its ends upon said frame, having a rearwardly directed arm connected to said first plunger, and an upwardly directed arm whereon said braking wheel is journaled, brake reaction means, including a brake reaction arm, also mounted upon said upwardly directed lever arm, brake torque resisting means interconnecting said brake reaction arm and the frame, and brake means reacting between the brake reaction means and the braking wheel.

7. A track-type landing gear comprising an endless track band, a frame, a front bogie wheel, a braking wheel ahead thereof and elevated thereabove, a rear wheel, additional bogie wheels intermediate the front bogie wheel and the rear wheel, an upper wheel supported from the frame, resiliently yieldable means supporting all wheels except the upper wheel from the frame and arranged in a pattern, including the upper wheel, to receive and guide said track band and to maintain it, between the front bogie wheel and the rear wheel, in ground contact while the landing gear is ground-borne; a support carried by and for movement relative to the frame, and constituting the immediate support of said braking wheel, said support being operatively connected for movement with the front bogie wheel, relative to the frame; brake reaction means carried by said support and anchored to said frame; and brake means reacting between said brake reaction means and said braking wheel.

8. A track-type landing gear including a frame, an endless track band, a plurality of wheels including a front braking wheel and an adjacent front bogie wheel, disposed about said frame at stations to receive and guide said track band, and means supporting the several wheels from the frame for generally complemental resilient yielding movement to maintain said track band taut under the influence of ground forces or shock, and reaction therefrom; wherein the supporting means for said front bogie wheel comprises a tandem shock absorber including a head relative to which the front bogie wheel is resiliently yieldable under the influence of large abrupt loads, and which is itself resiliently yieldable relative to the frame under the influence of gentle, less abrupt loads, and wherein the supporting means for the braking wheel comprises a lever pivoted between its ends upon the frame and having a short, upwardly directed arm whereon the braking wheel is journaled for rotation about said wheel's axis and a long, rearwardly directed arm operatively connected to said shock absorber head; a brake reaction member carried upon said lever and oscillatable about the axis of the braking wheel, brake means reacting between said reaction member and said braking wheel, and a torque link connected to the frame and restraining such oscillation of the reaction member.

9. In a track-type landing gear, an endless track band, a frame, a plurality of wheels, including a front bogie wheel, distributed about and supported from said frame in a pattern to receive and guide said track band and to maintain a material length of the same, from the front bogie wheel rearwardly, in ground contact while the landing gear is ground-borne, one of said wheels constituting a braking wheel, braking means operatively associated with said braking wheel, mounting means for said braking wheel, carried by and movable relative to the frame, for movement of the braking wheel automatically in response to forces produced by brake application, and organized and arranged that by such movement a force is produced, so directed as to tend to move upwardly the front bogie wheel, resiliently yieldable means reacting between the frame and said front bogie wheel to resist the latter's upward movement, and brake-reaction means automatically operable under the influence of brake application, reacting between the frame and said mounting means for the braking wheel, to counteract such movement of said mounting means to the degree that brake application tends to effect such movement, and thereby relieving said resiliently yieldable means from compressive forces acting thereon as a result of brake application.

10. A track-type landing bear as in claim 9, including supplemental resiliently yieldable means interposed directly between the first such means and the front bogie wheel.

GEORGE T. DRAKELEY.
DONALD W. FINLAY.

No references cited.